United States Patent
Freire et al.

(10) Patent No.: US 12,479,107 B2
(45) Date of Patent: Nov. 25, 2025

(54) METHOD AND AN ASSEMBLY UNIT FOR PERFORMING ASSEMBLING OPERATIONS

(71) Applicant: ABB SCHWEIZ AG, Baden (CH)

(72) Inventors: Jesús Freire, Vitoria (ES); Jorge Vidal Ribas, Esplugues de Llobregat (ES); Sergi Rodríguez Muñio, Sabadell (ES)

(73) Assignee: ABB SCHWEIZ AG, Baden (CH)

( * ) Notice: Subject to any disclaimer, the term of this patent is extended or adjusted under 35 U.S.C. 154(b) by 273 days.

(21) Appl. No.: 17/384,452

(22) Filed: Jul. 23, 2021

(65) Prior Publication Data

US 2022/0024041 A1  Jan. 27, 2022

(30) Foreign Application Priority Data

Jul. 27, 2020  (EP) .................................. 20382678

(51) Int. Cl.
*B25J 9/00* (2006.01)
*B25J 9/16* (2006.01)
(Continued)

(52) U.S. Cl.
CPC ........... *B25J 9/1697* (2013.01); *B25J 9/1633* (2013.01); *B25J 9/1664* (2013.01); *B25J 9/1684* (2013.01);
(Continued)

(58) Field of Classification Search
CPC ...... B25J 9/1697; B25J 9/1633; B25J 9/1664; B25J 9/1684; B25J 13/082; B25J 13/089;
(Continued)

(56) References Cited

U.S. PATENT DOCUMENTS

2008/0303307 A1* 12/2008 Savoy ........................ B60J 5/04
901/27
2011/0008736 A1  1/2011 Arai
(Continued)

FOREIGN PATENT DOCUMENTS

| CN | 104625676 A | * | 5/2015 | .............. B23P 19/00 |
| CN | 104625676 B | * | 9/2016 | .............. B23P 19/00 |

(Continued)

OTHER PUBLICATIONS

CN104625676B_ShaftHoleAssemblyIndustrialRobotSustemAndWorking MethodThereof.pdf (Year: 2016).*
(Continued)

*Primary Examiner* — Ramon A. Mercado
*Assistant Examiner* — Shaheda Hoque
(74) *Attorney, Agent, or Firm* — Peter B Scull

(57) ABSTRACT

A method is disclosed, including: providing a part having a target at which an assembly operation is to be performed by an industrial robot; determining the target position, by controlling the end effector of the robot to approach the target, detecting a contact between a location utensil attached to the end effector and the target and controlling the end effector of the robot at least by force control until the location utensil reaches a predetermined position relative to the target, and determining the target position as indicated by the absolute position of the location utensil when the location utensil is in said predetermined position relative to the target; registering the target position; and controlling the end effector of the robot to perform the assembly operation at the registered target position. An assembly unit or system is also disclosed.

17 Claims, 8 Drawing Sheets

(51) Int. Cl.
 *B25J 13/08* (2006.01)
 *B62D 65/06* (2006.01)
(52) U.S. Cl.
 CPC ........... *B25J 13/082* (2013.01); *B25J 13/089* (2013.01); *B62D 65/06* (2013.01)
(58) Field of Classification Search
 CPC ...... B25J 9/1687; B62D 65/06; B62D 65/024; B62D 65/028; B62D 65/14; B62D 65/18; G05B 19/401; G05B 2219/36048
 See application file for complete search history.

(56) References Cited

U.S. PATENT DOCUMENTS

| | | | | |
|---|---|---|---|---|
| 2011/0087360 | A1* | 4/2011 | Chen | B25J 9/1697 700/114 |
| 2017/0361885 | A1* | 12/2017 | Macri | B62D 65/06 |
| 2021/0339397 | A1* | 11/2021 | Zhang | B25J 9/1671 |

FOREIGN PATENT DOCUMENTS

| | | | | |
|---|---|---|---|---|
| EP | 1762817 | | 3/2007 | |
| EP | 1762817 | A1 | 3/2007 | |
| EP | 2045049 | B1 * | 9/2011 | ............ H01L 21/68 |
| EP | 3520971 | A1 * | 8/2019 | ............ B23P 19/04 |
| JP | 2019018298 | A * | 2/2019 | ............ B25J 9/1633 |
| WO | WO-2004026670 | A2 * | 4/2004 | ............ B25J 9/1684 |
| WO | WO-2004026672 | A2 * | 4/2004 | ............ B25J 9/1684 |
| WO | WO-2009123956 | A1 * | 10/2009 | ............ B25J 9/1697 |
| WO | WO2019154858 | A1 | 8/2019 | |
| WO | WO-2021047777 | A1 * | 3/2021 | |
| WO | WO-2021086327 | A1 * | 5/2021 | ............ B25J 13/085 |

OTHER PUBLICATIONS

Bazire et al., WO2021047777A1, Kuka Systems Aerospace SAS, Measurement Device for Monitoring Robot-Guided Processing of a Work Piece Surface and Related Method. (Year: 2021).*
WO2004026670A2 (Year: 2004).*
WO2004026670A2_Drawings (Year: 2004).*
EP3520971A1_AssemblingPartsInAnAssenblyLine_Drawings (Year: 2019).*
EP3520971A1_Assembling PartsInAnAssenblyLine (Year: 2019).*
KR102113636B1 (Year: 2019).*
ATI Industrial Automation, "ATI Force/Torque Sensors used in Force Controlled Assembly", Apr. 7, 2009, Youtube.com : https://www.youtube.com/watch?v=4Ro6rQbePqE (Year: 2009).*
Extended European Search Report for Application No. 20382678.9 issued by the European Patent Office, mail date Jan. 27, 2021, 9 pages, Munich, Germany.

* cited by examiner

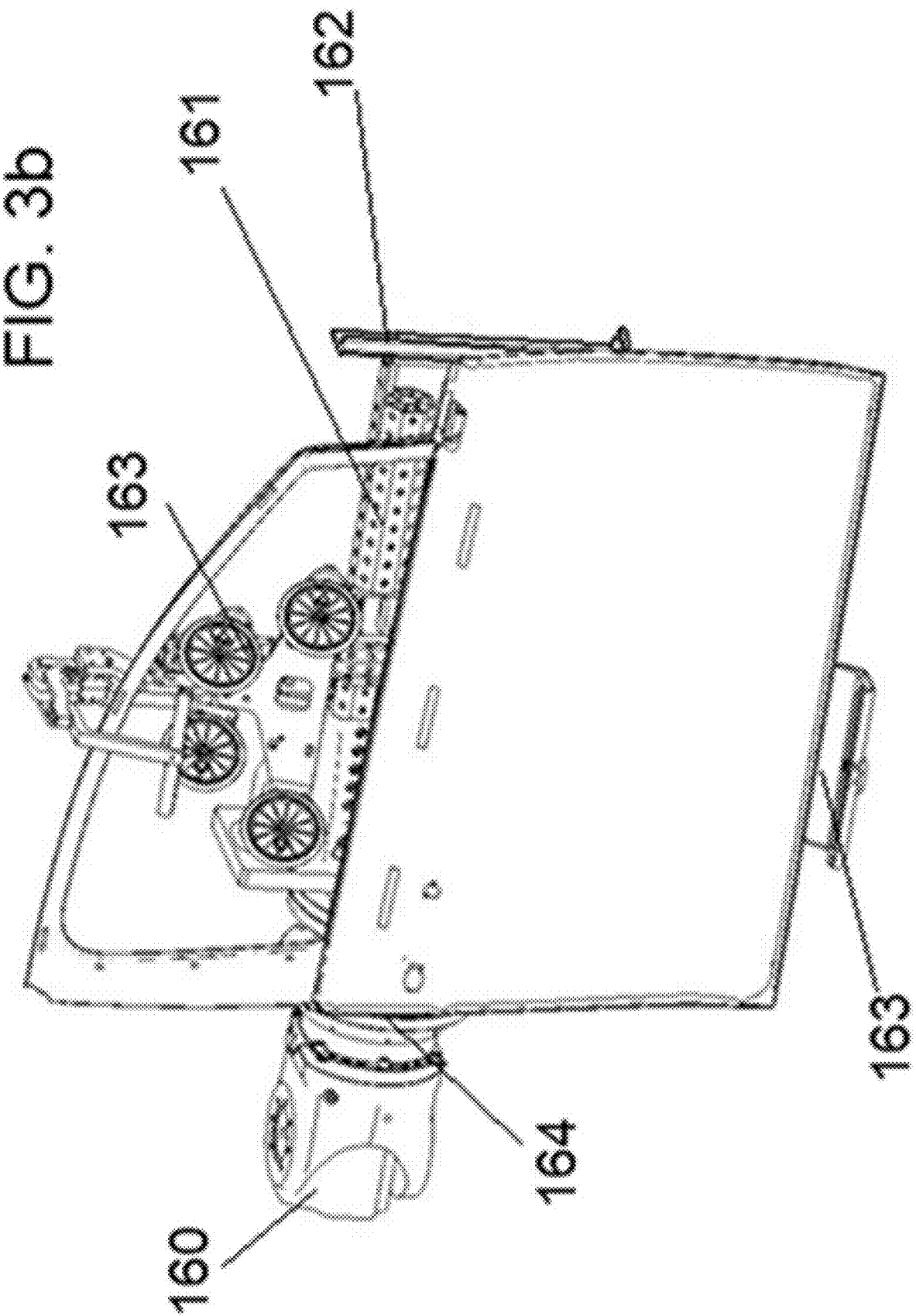

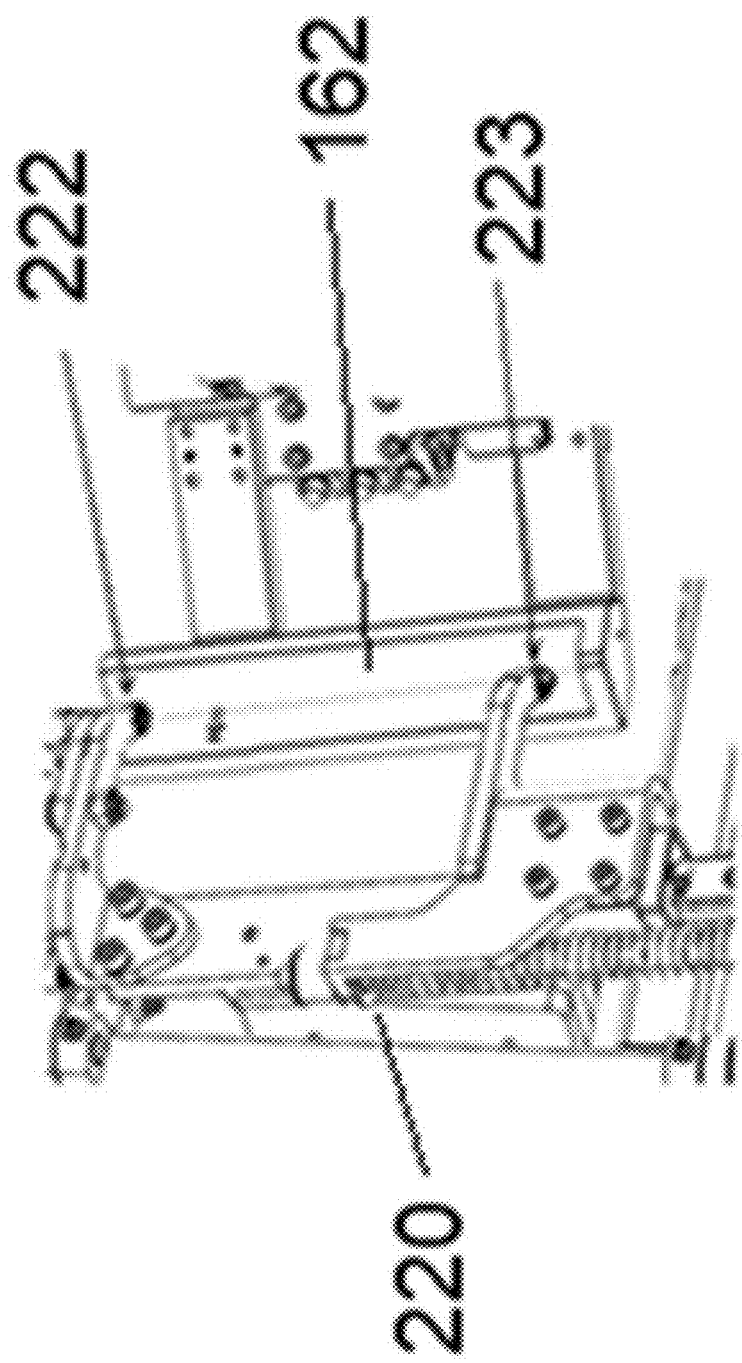

METHOD AND AN ASSEMBLY UNIT FOR PERFORMING ASSEMBLING OPERATIONS

The present disclosure is related to a method and to an assembly unit or system for performing an assembling operation on a part having a target for the assembling operation. Also disclosed is an assembly line, for example an automotive final assembly line, with such an assembly unit or system.

BACKGROUND

Automotive production lines for manufacturing vehicle bodies usually include a final assembly line where human operators and/or robots may operate to assemble components such as seats, doors, windshields, wheels, steering mechanisms, etc. on vehicle bodies that are advanced along the assembly line by suitable transporter such as chain conveyors, overhead conveyors, AGVs (Automated Guided Vehicles), etc.

An assembly robot for such an assembly line may typically be an industrial robot, provided with an end effector that carries a tool for performing an operation and/or carries a component (e.g. a wheel, a door, etc.) for attaching the component to the vehicle body. The end effector of the robot is controlled to perform a certain operation on a target of the vehicle body, for example attaching a door to the vehicle body by inserting the hinge pins of the door in corresponding hinge bushings of the vehicle body.

However, there are positioning tolerances and inaccuracies in the elements to be assembled in an assembly line, such that their position and/or orientation may lack the repeatability required for efficiently performing an assembly operation with the robot running on predetermined programs. For example, each vehicle body may be in a slightly different position on a conveyor or AGV, such that the door hinge bushings or other target for an assembly operation may not always be in the same position. Variations in the expected positioning of a target may be even more challenging when one of the elements to be assembled is moving, e.g. on a conveyor or AGV, during the assembly operation.

Prior applications US2011/0087360 and WO2019/154858, the contents of which are both incorporated by reference herein, disclose solutions for efficiently performing assembly operations with industrial robots in an assembly line. These solutions involve mounting real time vision systems, i.e. high frequency vision systems, as well as force sensors on an industrial robot, and controlling an assembly operation by combining visual servoing processes and force control (also referred to sometimes as soft control or compliant behaviour), based on the readings provided by the vision systems and the force sensors, thus allowing to compensate for positioning tolerances and inaccuracies, like human behaviour, sight and touch.

In particular, force control allows the end effector of the robot to adapt to the particular position of the elements to be assembled by reacting to the physical contact between the component to be assembled (carried by the end effector of the robot) and the target on the vehicle body. The controller controls the robot to complete the assembly operation depending on the forces that are exerted on the end effector due to said physical contact and are sensed by the force sensor.

However, some of the components to be assembled on the vehicle body require great caution as all the parts are already painted and any rubbing will cause defects, such as scratches on the paint or dents on the outer surface: it is therefore desirable to avoid or reduce the risk of unnecessary physical contact between the component to be assembled and the part, so as to prevent any such damage to the component and/or to the part.

It would therefore be desirable to facilitate a higher degree of robot automation in assembly lines, and particularly automotive final assembly lines, while avoiding undesirable damage to the components to be assembled.

SUMMARY OF THE DISCLOSURE

According to a first aspect of the present disclosure, a method is provided: for example, a method for handling components that are to be assembled on a target, the target belonging to a part, such as a vehicle body. The method includes:
  providing a part having a target at which an assembly operation is to be performed by an industrial robot,
  providing the industrial robot with an end effector and a location utensil attached to the end effector,
  determining the target position, by:
    controlling the end effector of the robot to approach the target,
    detecting a contact between the location utensil and the target, based on the readings of a force sensor,
    controlling the end effector of the robot at least by force control, based on the readings of the force sensor, to reach a predetermined position of the location utensil relative to the target, and
    determining the target position as indicated by the absolute position of the location utensil when the location utensil is in said predetermined position relative to the target,
  registering the target position, and
  controlling the end effector of the robot to perform the assembly operation at the registered target position.

This determination and registration of the target position may be carried out for each individual part, e.g. each individual vehicle body of a batch of vehicle bodies advancing in an assembly line, before the assembly operation is performed on the individual part.

The use of a location utensil attached to the industrial robot that performs the assembly allows the target position for each particular part to be accurately determined, registered, and used for the assembly operation, thus overcoming the difficulties associated with irregular or imprecise placement of the parts, poor repeatability, etc. and providing precise and safe assembly operations. Furthermore, neither the component to be assembled (e.g. a vehicle door) nor the part on which the assembly is performed are exposed to scratches and other damage that may be caused from unwanted contact of the component itself with the target, as may happen in a conventional assembly operation that is guided by force control, especially in certain operations where there is little space to manoeuvre.

Furthermore, a dedicated location utensil may allow a fast, safe and accurate determination of the position of the target, because, unlike the component to be assembled, the location utensil may be designed with any shape or configuration that is convenient for facilitating the approach to the target and the contact with it, and for providing a very stable contact with targets of any shape, dimension and orientation. A dedicated utensil may also be designed with surfaces that reduce the risk of damage to the target and provide a smooth contact with the target, e.g. with a coating of polytetrafluoroethylene (PTFE), elastomers or the like.

On the other hand, compared with vision control, force control may be more robust in certain conditions, and be less affected for example by poor light conditions, colour of the target, etc.

The robot controller may register the absolute position of the location utensil, e.g. taking as reference the robot base, when the utensil is in the predetermined relative position with respect to the target, and this absolute position is indicative of the position of the target, which may therefore be determined by the robot controller. In some cases determining the position of the target may require applying constant correction values to the absolute position of the location utensil, depending on the geometry of the target and location utensil.

The position of the target is defined herein as the absolute position of the target, e.g. taking as reference the stationary robot base.

The predetermined position of the location utensil relative to the target, and in contact with the target, may be detected by the controller depending on the forces acting on the end effector and sensed by the force sensor: a predetermined set of forces acting on the end effector (i.e. a predetermined set of readings of the force sensor) may be associated with the predetermined position of the location utensil relative to the target.

For example, the location utensil may be shaped to contact the target on three perpendicular planes (e.g. it may have or be three plates forming 90° angles): when the forces acting on the end effector in the three perpendicular directions reach a predetermined threshold, this indicates stable contact between the location utensil and the target. Other shapes and configurations of the location utensil may be implemented, depending on the target.

The predetermined set of readings of the force sensor corresponding to the predetermined position of the location utensil relative to the target may include forces in at least in one direction, for example in three perpendicular directions, and may also have torques about at least one axis, for example about three perpendicular axes.

In some implementations, a force sensor to detect external forces acting on the end effector may be mounted on the robot between the wrist and the end effector, to detect the strain between the two elements and provide information about the forces and torques acting on the end effector, and therefore about the relative position between the end effector and the location utensil. Force and/or torque sensors may also be associated to several robot axes. The output of the sensors is connected to the controller, such that the controller may control and guide the movement of the end effector depending on the readings of the sensors, i.e. with force control.

Such force/torque sensors may be provided with resistance strain gauges to measure the strain applied in several degrees of freedom, for example in all six degrees of freedom (three force components and three torque components).

Alternatively, an indirect force sensor may be provided, to determine the current consumed by the actuators of the robot, e.g. the internal motors for moving each robot axis: the consumed current of a motor and the torque on the motor are proportional, and the torque on the motor is a function of the robot dynamics and of external forces acting on the robot, so sensing or measuring the consumed current allows determining the external forces.

In some implementations of the method, the end effector of the industrial robot is controlled to approach the target based on the readings of a vision system, which may include a vision sensor mounted on the end effector.

In some implementations, determining the target position includes controlling the end effector of the robot to reach the predetermined position of the location utensil relative to the target by a combination of the readings of the vision system (i.e. by a visual servoing process) and force control based on the readings of the force sensor (also referred to as compliant behaviour or soft control).

The control of the end effector for positioning of the location utensil relative to the target, using a combination of visual servoing through the readings of the vision system and of compliant behaviour through the readings of the force sensor, may be performed as described in detail for an assembly operation in WO2019/154858, page 18, line 1 to page 26, line 22, and corresponding FIGS. 3 and 4.

In examples of the method, the absolute position of the location utensil when it is in the predetermined position relative to the target may be indicative also of the target orientation, such that once this predetermined position has been reached, both the target position and the target orientation may be registered, and the end effector of the robot may be controlled to perform the assembly operation at the registered target position and according to the registered target orientation.

For example, the target may include two spaced apart features, such as two aligned hinge bushings, and the component to be assembled may include features matching the target features, such as two aligned hinge pins. The orientation of the two hinge bushings is also indicated by the absolute position of the location utensil when it is in the predetermined position relative to the target. The detection of this position may involve e.g. detecting forces and torques acting on the end effector: for example, a torque may indicate that the location utensil is in contact with only one of the two features of the target.

The assembly operation may then include controlling the end effector to position the component such that the features (e.g. two hinge pins) that match the target features (e.g. two hinge bushings) are in the same orientation as the registered orientation of the target features.

In some implementations, the part having the target on which an assembly operation is to be performed is moving during the determination of the target position and during the assembly operation, and the method further includes:
  tracking the movement of the part, and
  controlling the end effector of the robot to perform the assembly operation based on the registered target position and based on the tracking of the movement of the part from the moment the position of the target is registered until the assembly operation is completed.

In this case, as soon as the target position is registered, the controller of the end effector may start updating the registered target position with the part tracking data, e.g. in real time, so the subsequent assembly operation may be performed according to the updated target position.

In some implementations the robot may be displaceable, e.g. the robot base may be mounted on a track and controlled to travel synchronized with the part tracking data during the determination of the target position and the assembly operation, such that the target position with respect to the end effector is substantially constant and the assembly operation is performed as if the target was substantially stationary with respect to the robot.

In implementations of the method, the assembly operation may include dropping or mounting a component that is carried by the end effector on the target: for example, the target may be a hinge bushing of the part, and the assembly operation may include mounting a component on the part by dropping a hinge pin of the component in the hinge bushing.

In some examples the end effector carries the component to be assembled on the target already during the determining the target position, i.e. the component is picked by the end effector, e.g. a gripper of the end effector, before the target position is determined, such that the component may be assembled shortly after the target position is registered. In other examples, the end effector may be controlled to pick the component to be assembled on the target only after the determining the target position. One or the other of the two alternative solutions may be preferable depending on the circumstances, e.g. on the configuration of the component, the time available for the operation, the required accuracy, etc.

The part with the target may be a vehicle body mounted on a transport system and advanced in an automotive final assembly line, and the industrial robot may be arranged along the assembly line to pick, drop or mount a vehicle component on the vehicle body, at the desired target. Vehicle components which could be mounted on the vehicle body with implementations of the method may be doors, wheels, the dashboard, and many others.

Also provided is a method for assembling a component on a target of a vehicle body in an automotive final assembly line, including advancing the vehicle body in the assembly line, and performing a method as disclosed herein, with the part having a target being the vehicle body and with the assembly operation performed by the end effector of the robot including mounting the component on the vehicle body.

More generally, methods according to implementations of the present disclosure may be for performing an assembly operation with an industrial robot, in which a component is assembled on a target of a part; including but not limited to assembly lines for electrical appliances or other products, individual assembly operations, etc., All features and details disclosed herein in relation with the assembly of a component on a vehicle body are similarly applicable to the assembly of a component on a target of any other object.

In some implementations of a method hereof it is optionally foreseen that the position and/or orientation with respect to the industrial robot of the component may also be determined and registered prior to the assembly operation, so as to facilitate and make more accurate the operation itself, by accurately matching the position and orientation of the component with those of the target on the part.

This determination of the position and/or orientation of the component with respect to the industrial robot may be performed with the help of an auxiliary location utensil, by operating in a similar way as in the determination of the target position in the above methods.

For example, the end effector of the industrial robot carrying the component may be controlled, e.g. with the help of a vision system, so that the component approaches the auxiliary location utensil; once there is contact between the auxiliary location utensil and the component, the end effector of the robot may be controlled at least through force control, based on the readings of the force sensor, and optionally also through the vision system, to reach a predetermined position of the component with respect to the auxiliary location utensil. At this point, the position and orientation of the component, e.g. with reference to the robot base, may be registered to be used in the subsequent assembly operation.

The auxiliary location utensil is external to the robot carrying the component, and it may be stationary and passive, e.g. mounted on a dedicated fixture within reach of the industrial robot carrying the component, or it may be carried by an auxiliary robot.

Also provided is a multi-part method for assembling components on a vehicle body in an automotive final assembly line, in which:
  in the first place, at a first station of the assembly line, an industrial robot picks and removes a vehicle door from a vehicle body, e.g. from the vehicle body hinges, and using a method as disclosed above the same robot assembles it on a door holding fixture or support, which is separate from the vehicle body, and usually separate from the vehicle body assembly line, such that the door opening of the vehicle body remains free to assemble other components in the vehicle body; and
  subsequently, at a second downstream station, after several other assembly operations have been performed on the vehicle body, an industrial robot picks and removes the door from the door holding fixture and, again using a method as disclosed above, the same robot re-assembles it on the vehicle body, e.g. on the vehicle body hinges.

In alternative implementations of such a method involving the disassembly and reassembly of the door with respect to the vehicle body, one of the operations of assembling the door, e.g. the assembly of the door on the door holding fixture, may be carried out in a conventional way, without the determination of the target position using a location utensil.

The vehicle body may be on the move in the production line during the reassembly operation of the door on the vehicle body hinges.

The door holding fixture or support may be provided with fixture hinges to receive the door, similar to the hinges of the vehicle body, and it may be attached to a transporter so as to travel, e.g. substantially in parallel with the vehicle body from the first station of the assembly line to the second station of the assembly line, while it is fitted with sub-components such as windows, trim, seals, loudspeakers, etc.

According to a second aspect, the present disclosure provides an assembly unit or system for assembling a component on a target of a part in an assembly line, the assembly unit or system including:
  an industrial robot having at least three axes between a robot base and a robot wrist,
  an end effector attached to the robot wrist, and having attached thereto a location utensil and a gripper to pick and release the component to be assembled,
  a force sensor arranged to sense external forces acting on the end effector, and
  a controller,
the controller determining and registering the position of the target of the part, by:
  controlling the end effector to approach the target,
  detecting a contact between the location utensil and the target, based on the readings of the force sensor,
  controlling the end effector at least by force control, based on the readings of the force sensor, to reach a predetermined position of the location utensil relative to the target,
  determining the target position as indicated by the absolute position of the location utensil when the location utensil is in said predetermined position relative to the target, and
  registering the target position;

and the controller controlling the end effector to perform the assembly operation at the registered target position.

The force sensor may be mounted on the robot between the wrist and the end effector to provide data about external forces and torques acting on the end effector, and therefore about the relative position between the end effector and the location utensil.

In implementations, the assembly unit or system further includes a vision system with a tracking vision sensor for tracking the movement of the part along the assembly line, and the controller further controlling the end effector of the robot to perform the assembly operation at the target position based on the registered target position and based on the tracking of the movement of the part.

Also disclosed herein is an automotive final assembly line including a transport system to advance a part, such as a vehicle body, along the assembly line, and an assembly unit or system as disclosed in any of the above examples, arranged to perform an assembly operation in target area of the part or vehicle body, according to implementations of the method disclosed herein.

Additional objects, advantages and features of implementations will become apparent to those skilled in the art upon examination of the description, or may be learned by practice.

BRIEF DESCRIPTION OF THE DRAWINGS

Particular implementations of the present disclosure will be described in the following by way of non-limiting examples, with reference to the appended drawings, in which:

FIGS. 3a and 3b are two perspective views from different sides of an end effector of an industrial robot, having a location utensil attached thereto and carrying a vehicle door;

FIGS. 4a to 4c are perspective views illustrating an operation of a method according to an implementation of the present disclosure, performed on a door holding fixture target;

DETAILED DESCRIPTION

Figure 1:
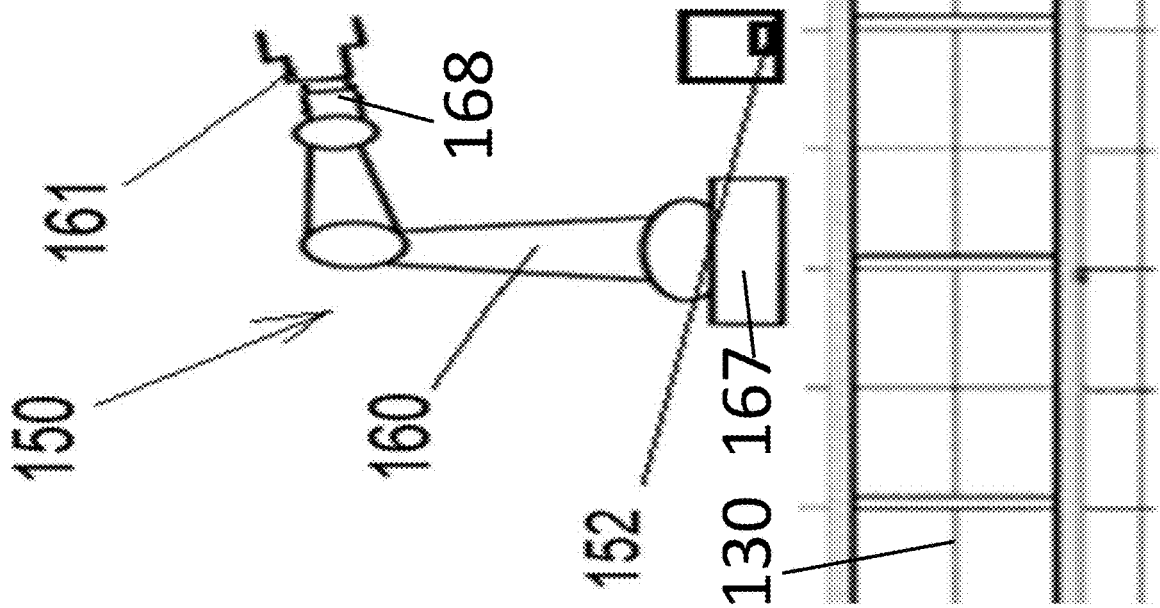
FIG. 1 is a schematic view of an assembly line with an assembly unit or system, according to an example, and of a transporter with a door holding fixture.
Figure 1:
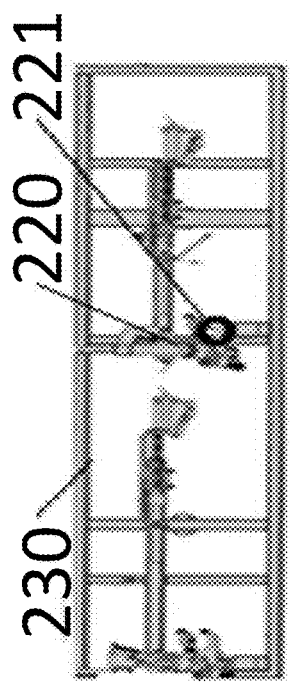

FIG. 1 shows schematically, and not at scale, an assembly line 110, in the example an automotive final assembly line, where a transporting system 130 advances a part, in the example a vehicle body 120, in an advance direction D1, past an assembly unit or system 150.

Figure 2:
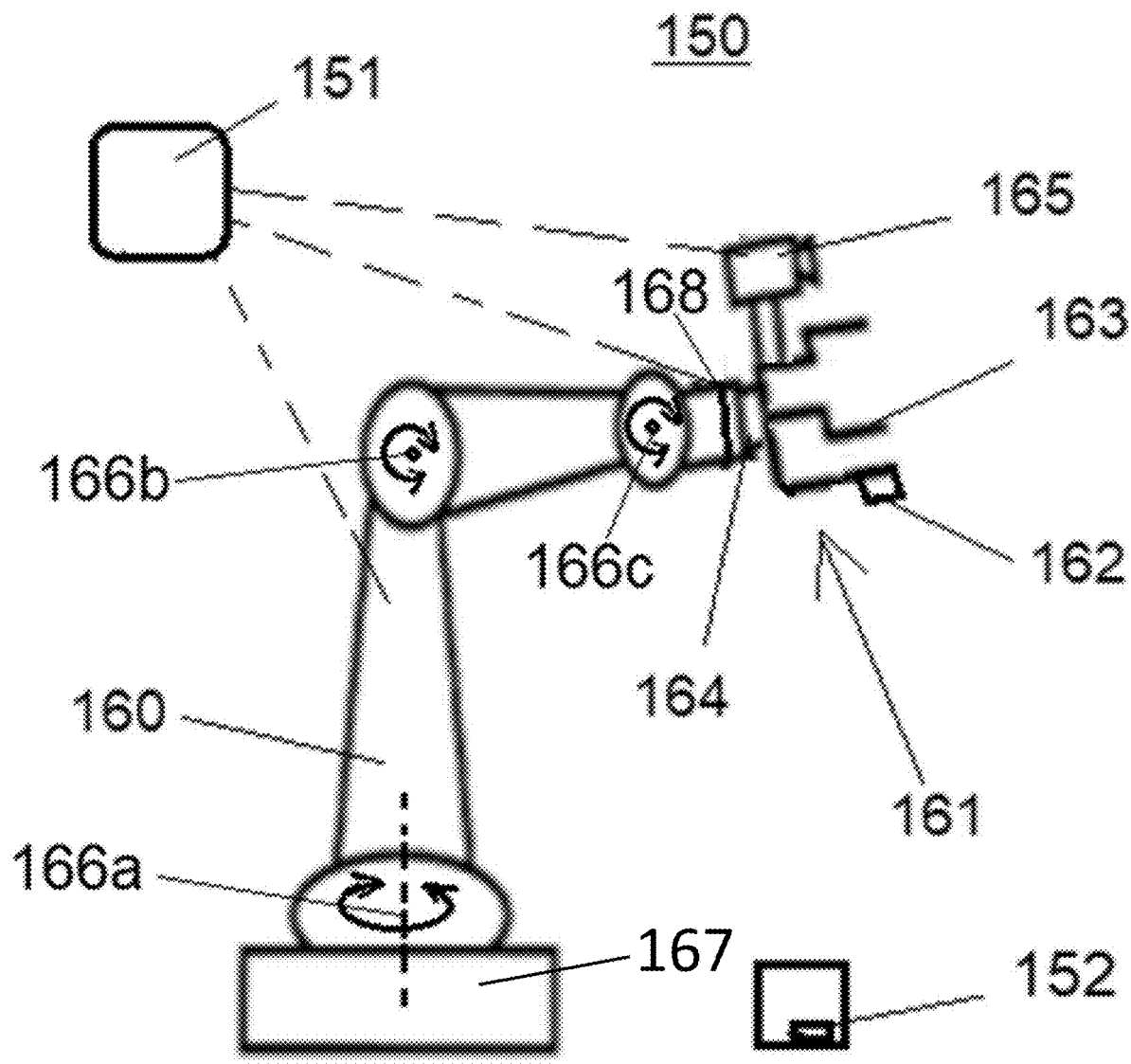
FIG. 2 is a schematic representation of an assembly unit or system according to an example.

The assembly unit or system 150 includes an industrial robot 160, which may include a controller and a number of programmable axes (e.g., axes 166a, 166b and/or 166c inter alia, as shown in FIG. 2), i.e. rotational and/or linear degrees of freedom, between a robot base and a robot wrist, each axis having an associated driving element, such as a motor, controlled by the robot controller. The configuration of an industrial robot is known, and the details are not shown in the figures.

The robot 160 may be provided with an end effector 161 attached to the robot wrist 168, to perform a certain operation, for example a gripper, a tool, a support for holding a part to be assembled, etc. The robot base 167 may be attached to the floor, or it may be roof or wall mounted, or it may be mounted on a track e.g. parallel to the assembly line.

The vehicle body 120 may be transported at a constant speed of about 100 mm/s, for example on a skillet or overhead conveyor or on an AGV (Automated Guided Vehicle).

The vehicle body 120, or other part on which an assembly operation is to be performed, may include a target 121 (indicated with a circle) for the assembly operation. In an assembly operation the target 121 of the vehicle body 120 may be e.g. a recess, a hole, a pin, combinations of several holes and/or pins, etc., where matching features of another part, such as a door or a wheel, is to be fitted during the assembly operation.

An assembly operation may include e.g. dropping, attaching or otherwise assembling a component on the target.

Examples of operations which may be performed with an industrial robot provided with a suitable end effector, according to implementations of the method and assembly unit or system disclosed herein, may be disassembling the doors from the vehicle body, before other internal elements are inserted, and dropping the doors on targets of dedicated supports or fixtures; re-assembling the doors on targets of the vehicle body; assembling the vehicle dashboard or the wheels on targets of the vehicle body, etc.

Vehicle doors, for example, may be removed from the vehicle body at a first station along the assembly line, such that there is free access to inner areas of the vehicle body, e.g. to mount the dashboard, and later re-assembled at a second downstream station of the assembly line.

FIG. 1 may schematically represent one of such stations of the assembly line, e.g. the first station, where a door (not shown in FIG. 1) is removed from the vehicle body 120, or e.g. a second station, where the door is re-assembled on the vehicle body 120, at vehicle body target 121 (schematically indicated with a circle in the figure and which in this case may include two hinge bushings).

When removed from the vehicle body 120, the door may be placed on a dedicated support, i.e. a door holding fixture 220, which may also be mounted on a transporter 230, for example an AGV (Automated Guided Vehicle) for being displaced towards the second station, as shown by arrow D1. The door holding fixture 220 may have a target 221 (indicated with a circle) for an assembly operation, i.e. for receiving the door: for example, the fixture target 221 may include two hinge bushings in which complementary hinge pins of the door are inserted in the assembly operation.

The door may be fitted with moldings, windows, door trim and other elements, while it is displaced from one station to another while placed on the door holding fixture 220, before being re-assembled to the vehicle body 120.

FIG. 2 shows schematically an example of the assembly unit or system 150, including the industrial robot 160 fitted with the end effector 161 attached to the robot wrist 168, and a controller 151, which may be the controller of the robot 160.

The end effector 161 may have attached a location utensil 162, and a gripper 163 to pick and release a component, such as a door, to be assembled. A force sensor 164 may be arranged between the wrist 168 of the robot 160 and the end effector 161 to sense external forces acting on the end effector 161.

The assembly unit or system 150 may also include a vision system, with a vision sensor 165, such as a camera. The vision system may provide readings to the controller 151, to control the movement of the end effector 161 during at least part of an assembly operation. The camera or other vision sensor 165 may be mounted attached to the end effector itself, as shown schematically in FIG. 2. The assembly unit or system 150 may also include an additional vision system, e.g. stationary vision sensor 152 to track the advance of the vehicle bodies along the assembly line 110.

Implementations of such a vision system may be, but is not limited to those, as described in US2011/0087360 or in WO2019/154858 and may operate in the same manner.

In order to perform an assembly operation on a part (e.g., with reference to FIG. 1, on the vehicle body 120 or on the door holding fixture 220), the controller 151 may determine and register the position of the target 121 or 221 of the part, e.g. the vehicle body 120 or the door holding fixture 220, and to control the end effector 161 to perform the assembly operation at the registered target position.

For determining and registering the position of the target 121 or 221, the controller 151 may perform the following operations:
- controlling the end effector 161 to approach the target 121 or 221,
- based on the readings of the force sensor 164, detecting a contact between the location utensil 162 and the target 121 or 221,
- once contact is detected, controlling the end effector 161 at least by force control, based on the readings of the force sensor 164, to reach a predetermined position of the location utensil 162 relative to the target 121 or 221,
- determining the target position as indicated by the absolute position of the location utensil 162 when the location utensil 162 is in said predetermined position relative to the target 121 or 221, and
- registering the target position;

and the controller 151 controlling the end effector 161 to perform the assembly operation at the registered target position.

When the location utensil is in the predetermined position relative to the target, the absolute position of the target can be accurately determined, because the absolute position of the location utensil is known to the controller, and so is the relative position between them.

In the present disclosure, by "absolute position" of an object it is meant the spatial position of the object taking as reference the stationary robot base, i.e. in a coordinate system fixed to the robot base; or fixed to the floor, if the robot is mounted on a track.

The absolute position of the target will be generally referred to as "the position of the target".

The determination of the target position will be described with more detail in the following.

Figure 3A:
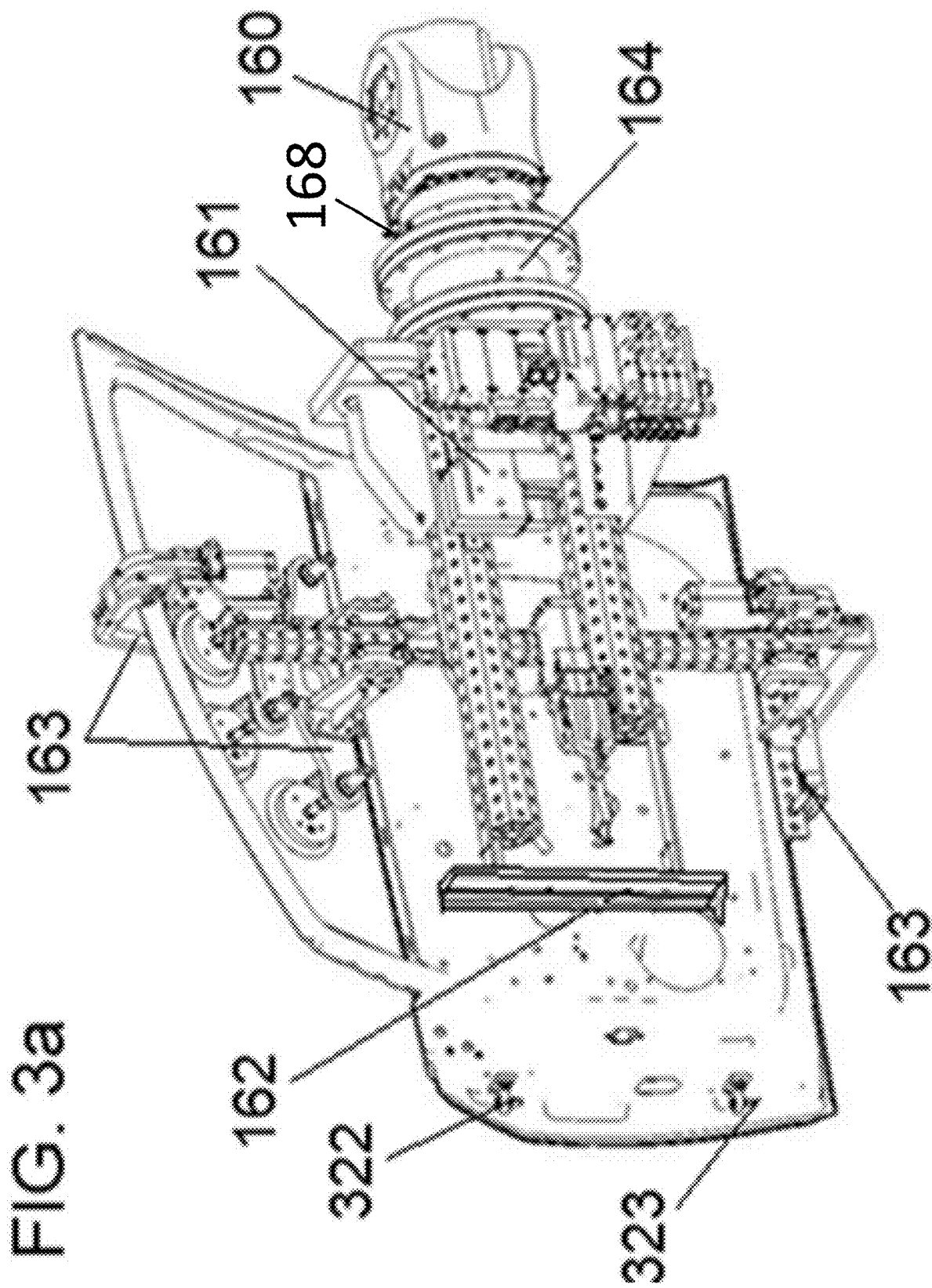

FIGS. 3a and 3b are side views taken from different angles, showing the end effector 161 of the robot 160 with a location utensil 162 attached thereto (only the wrist 168 of the robot 160 is depicted in the figure). The end effector 161 is carrying a vehicle door, held by a gripper 163 (the gripper including e.g. suction cups attached to the window). The vehicle door has two hinge pins 322, 323 (FIG. 3a) intended to be inserted in two corresponding hinge bushings, when the door is assembled on the vehicle body 120 and also when it is dropped on the door holding fixture 220.

In this example, the location utensil 162 is elongate and constructed with three plates arranged perpendicular to each other (as more clearly visible in FIGS. 4a-4c), which allows determining the position and orientation of the two hinge bushings of the target simultaneously and accurately, as is described in the following.

Figure 4A:
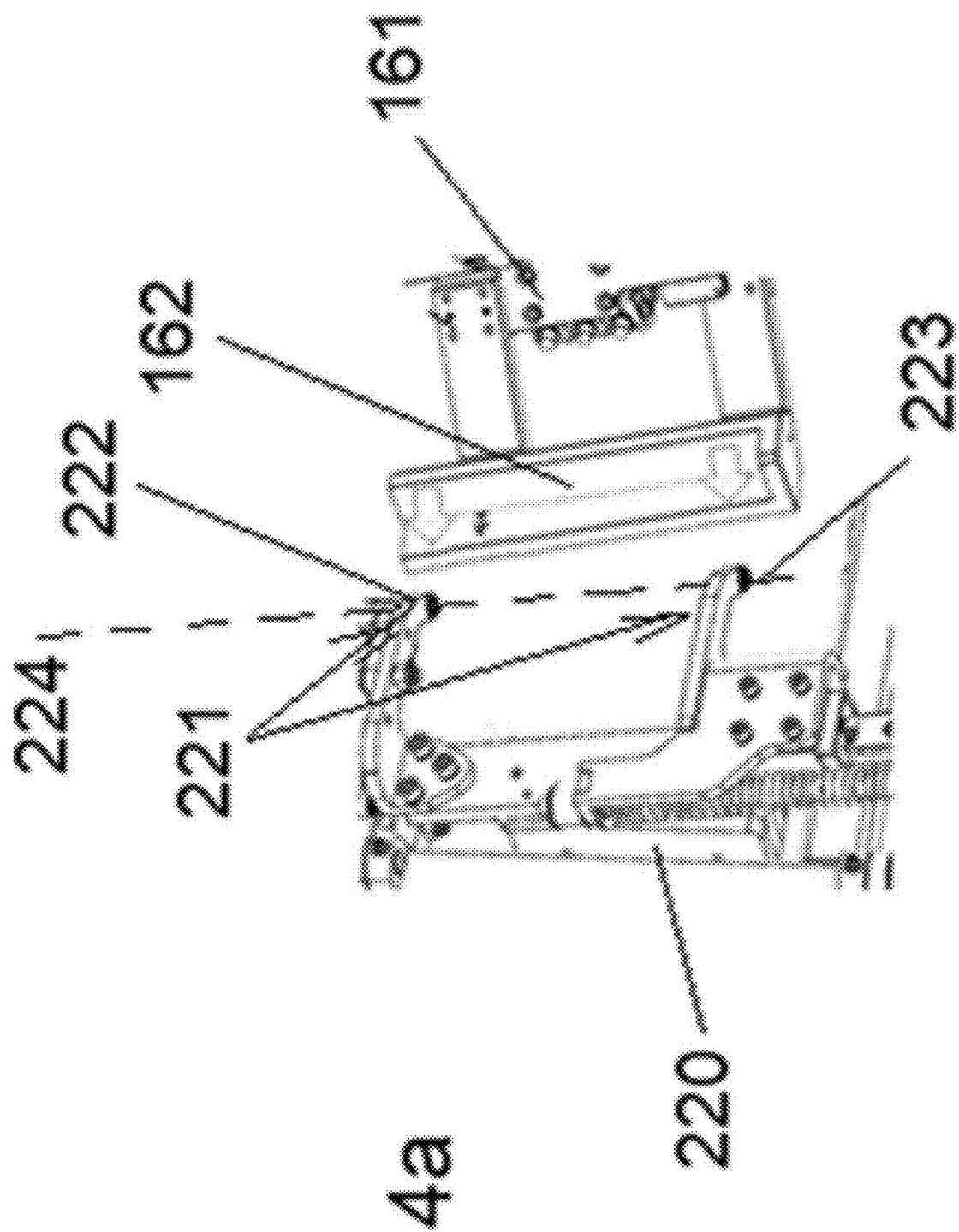
Figure 4C:
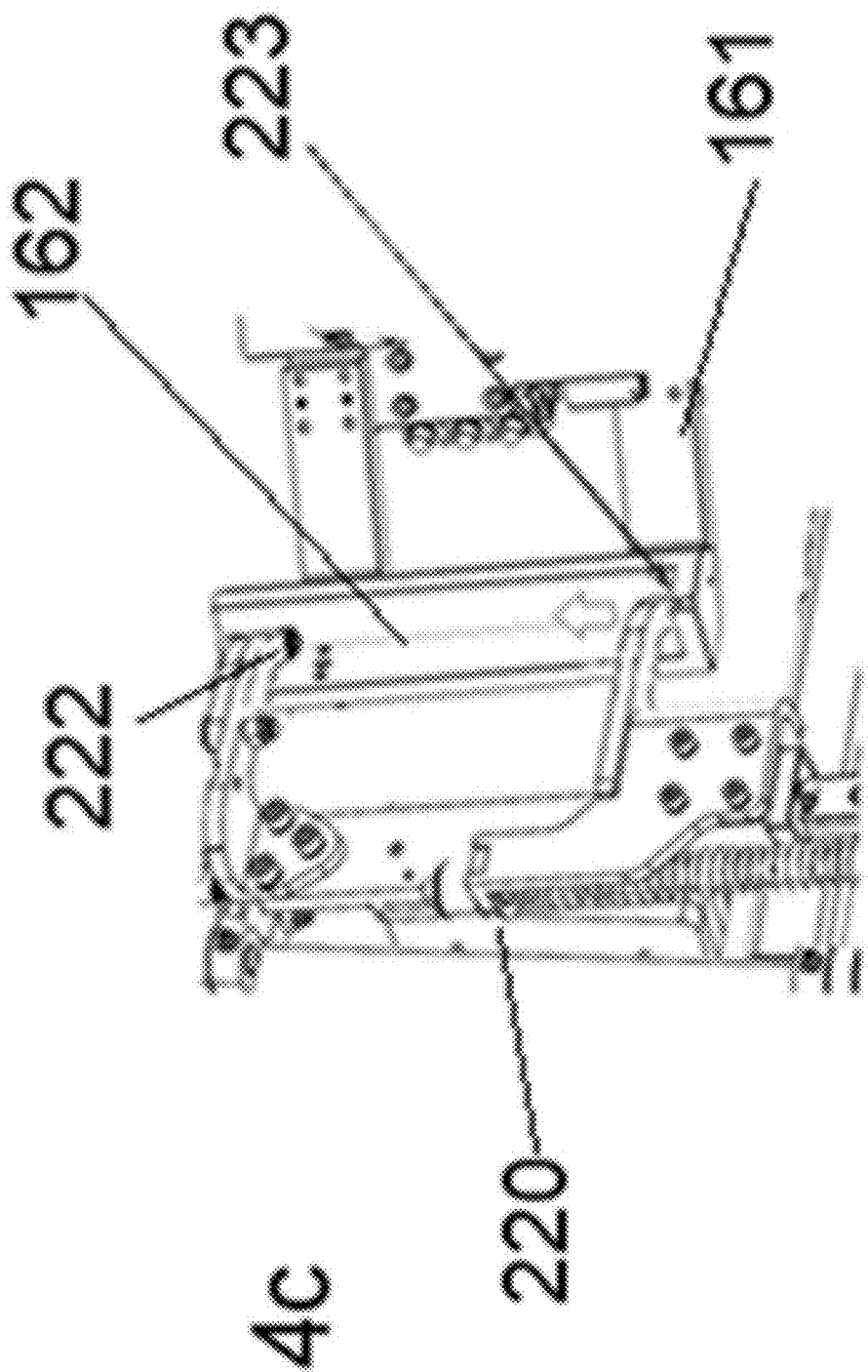

FIGS. 4a-4c show in perspective view the location utensil 162 attached to the end effector 161, in three successive positions during the process in which the controller 151 guides the end effector 161 such that the location utensil 162 approaches the target 221 of the door holding fixture 220 and reaches a predetermined position relative to the target 221.

In this example of assembling the vehicle door on the door holding fixture 220, the target 221 includes two features, i.e. two hinge bushings 222, 223 on a hinge axis 224, in which the two hinge pins 322, 323 of the vehicle door are to be received.

In FIG. 4a the end effector is being guided by the controller 151 e.g. by visual servoing, to approach the target 221 as shown by the arrows, with a general orientation that is similar to that of the hinge axis 224 of the target 221, which may be determined by the controller from the vision sensor readings, or may be pre-programmed.

Once the location utensil 162 contacts at least one of the hinge bushings 222, 223, the controller starts guiding the location utensil also by force control: the robot becomes "soft", i.e. not stiff, such that it is allowed to deviate to a certain extent from an intended trajectory depending on the applied external force, e.g. depending on the components of force and torque detected by the force sensor 164.

By this process of force control the controller 151 first guides the location utensil 162 towards the hinge bushings 222, 223 until they are both in the inner corner of the utensil 162, i.e. until each hinge bushing 222, 223 is in contact with both elongate plates of the utensil 162. At this point the location utensil 162 is oriented in the direction of the hinge axis 224, and it matches the position of the hinge bushings 222, 223 in the two directions perpendicular to the hinge axis 224. This position of the location utensil 162 is shown in FIG. 3b.

The controller then displaces the location utensil 162 upwards along the hinge axis 224 (as shown by the arrow in FIG. 3c) until the hinge bushing 223 contacts the lower plate of the location utensil 162, this contact being sensed by the force sensor 164.

At this point the location utensil 162 has reached the intended predetermined position relative to the target 221, and in stable contact with the target (FIG. 3c): the predetermined relative position is determined by the controller from the readings of the force sensor 164.

The controller 151 may then accurately determine and register the target 221 position and orientation (i.e. the absolute position and orientation of the target 221, referenced e.g. to the robot base 167), which are established by the absolute position and orientation of the location utensil 162.

The controller 151 then operates the end effector 161 to withdraw the location utensil 162 from the target 221; to move the vehicle door with the hinge pins 322, 323 towards the target 221; to perform the assembly operation by inserting the hinge pins 322, 323 of the door in the hinge bushings 222, 223 of the door holding fixture 220, using the registered position and orientation of the target; and to release the door, leaving it hanging on the door holding fixture 220.

It will be understood that since the position and orientation of the target 221 (hinge bushings 222, 223 and hinge axis 224) of the particular and individual door holding fixture 220 are determined and registered using the location utensil 162 before the assembly operation, this method overcomes the drawbacks associated with poor repeatability and inaccuracies due to the differences in position and orientation between one door holding fixture and another on the transporter, and therefore it allows assembling or dropping the door on the fixture without the risk of damage to the paint and surfaces of the door itself.

In some implementations, before performing the assembly operation of dropping the vehicle door on the target 221 of the door holding fixture 220, the controller 151 may determine and register the precise position and/or orientation of the vehicle door hinges 322, 323 with respect to the end effector 161.

This may be carried out in a similar way as in the determination of the target position described with reference to FIGS. 4a-4c, but with the assistance of an auxiliary location utensil 402 (see FIG. 1), similar in configuration to location utensil 162, attached to a dedicated fixture 400 and placed within reach of the end effector 161.

Such an auxiliary location utensil 402 may be stationary and passive, i.e. to simply serve as a fixed reference. For example, the controller 151 may control the end effector 161 carrying the door to approach the auxiliary location utensil 402, then use force control, based on the readings of the force sensor 164, to reach a predetermined position of the door hinges 322, 323 with respect to the auxiliary location utensil 402. At this point, the position and orientation of the door hinges 322, 323, e.g. with reference to the robot base, may be registered by the controller 151, to be used in the subsequent assembly operation.

An assembly unit or system 150 and an assembly process analogous to those described above for dropping the vehicle door on a door holding fixture 220, may be employed for the subsequent operation of re-assembling the door on the vehicle body 120. In this case the location utensil 162 may be employed in the same manner to determine and register the position and orientation of the target 121 on the vehicle body 120 (FIG. 1), the target 121 including two hinge bushings (not shown) similar to hinge bushings 222, 223.

In some assembly operations the part with the target on which a component must be assembled may be moving, e.g. in the case of a vehicle body in a final assembly line. An example of such a case is for example the re-assembly of the door on the target 121 (hinge bushings) of the vehicle body 120 described in the previous paragraph. The part with the target my move with constant or variable speed, and possibly including stops.

In such cases the target may be moving during the process described above for determining the target position and/or during the assembly operation. The assembly unit or system 150 may then track the movement of the part, e.g. vehicle body 120, along the assembly line. For this purpose the assembly unit or system 150 may include a vision system, including one or more tracking vision sensors 152 (see FIG. 1) such as cameras, arranged stationary along the assembly line or mounted on a robot, for tracking the movement of the part in the assembly line.

The tracking vision sensors 152 may track a feature of the part itself (e.g. a hole in the vehicle body), or it may track a marking, which may be attached to the part itself or to the transporter advancing the part, such as an AGV, a skid, a skillet, etc.

The controller 151 may then control the end effector 161 of the robot 160 during the assembly operation based on the registered target position and also based on the movement of the part as tracked by the vision sensors 152, from the moment the position of the target is registered and until the assembly operation is completed. For example, as soon as the target position is determined and registered the controller 151 may start updating the registered target position with the tracking data according to the readings of the tracking vision sensor 152, e.g. in real time, so the subsequent assembly operation is performed according to the updated target position.

The tracking vision sensor 152 may optionally be used also during the determination of the target position: in this process the controller 151 may control the end effector 161 of the robot 160 based not only on the robot vision system and force control, but also based on the readings of the tracking vision sensors 152.

In some implementations the robot 160 may be displaceable, e.g. the robot base may be mounted on a track (not shown) and controlled to travel synchronized with the part according to the readings of the tracking vision sensor 152, during the determination of the target position and during the assembly operation, such that the relative position of the target with respect to the end effector is substantially constant.

Figure 5:
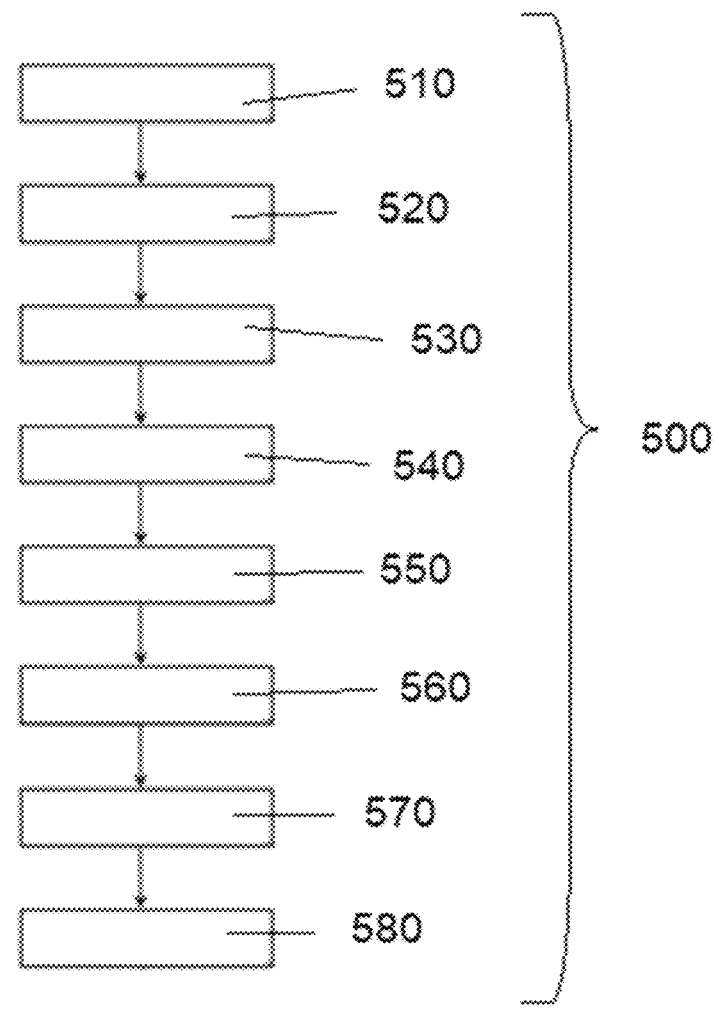
FIGS. 5 and 6 are flow diagrams of methods according to implementations of the present disclosure.

FIG. 5 is a flow diagram of a method 500 according to the present disclosure for handling components that are to be assembled on a part, the part having a target for the assembly operation, as for example the method explained above for dropping the vehicle door on the door holding fixture 220.

In block 510, the part having a target for an assembly operation is provided.

In block 520, the industrial robot is provided with an end effector and a location utensil attached to the end effector, a force sensor arranged to detect external forces on the end effector, e.g. between the wrist of the robot and the end effector, and a vision sensor.

In blocks 530 to 560 the position of the target is determined, through: controlling in block 530 the end effector of the robot to approach the target, by a visual servoing process based on the readings of the vision sensor; detecting in block 540 when the location utensil contacts the target, based on the readings of the force sensor; controlling in block 550 the movement of the end effector of the robot at least by force control, based on the readings of the force sensor, to reach a predetermined position of the location utensil relative to the target, and determining in block 560 the target position as indicated by the absolute position of the location utensil when the location utensil is in the predetermined position relative to the target.

In block 570, the target position determined in block 560 is registered by the robot controller.

Finally, in block 580 the end effector of the robot is controlled to perform the assembly operation at the target position registered in block 570.

In two alternative implementations of such a method, the end effector may pick a component to be used in the assembly operation before the operation of block 530, or it may pick the component only after the position of the target is registered in block 570.

Furthermore, either before block 530 (before determining the position of the target), or between blocks 570 and 580 (before the assembly operation), the position and/or orientation of a component to be assembled, which is carried by the end effector of the robot, may be determined in a similar way as in the determination of the target position of blocks 530-570, but with the assistance of an auxiliary location utensil, e.g. external to the robot and stationary, such as described above.

Implementations of this method may be employed in several operations. For example, FIG. 6 is a flow chart illustrating a method 600 for assembling components on a vehicle body 120, and more particularly a method 600 for handling the doors of the vehicle in an automotive final assembly line, which may include using implementations of the method 500 according to the present disclosure in two different stations of the assembly line 110 (see FIG. 1).

Figure 6:
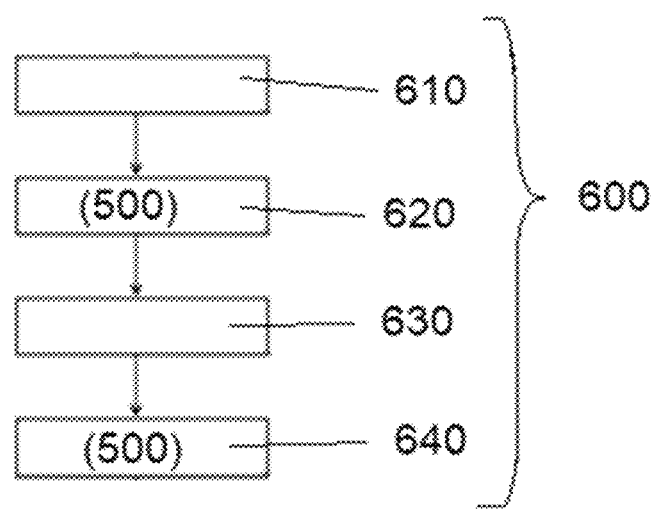

This method 600 illustrated in FIG. 6 first includes, in block 610, removing the door from the vehicle body 120 at a first station, by lifting it from the hinge bushings with a first industrial robot, such as robot 160 shown in FIG. 2.

In block 620, the method 500 of FIG. 5 is performed to place the door on a door holding fixture 220 with target 221 including hinge bushings 222, 223 such as described in relation to FIGS. 4a-4c: in this case, the part having the target is the holding fixture 220.

After the required operations are performed both on the vehicle body 120 and on the door, along respective assembly lines, the door may be again re-assembled on the vehicle body 120: for this purpose, in block 630 the vehicle door is removed from the holding fixture 220 in a second station, downstream of the first station along the assembly line 110, using a second industrial robot, like robot 160 shown in FIG. 2; the holding fixture 220 with the door mounted on it has travelled to the second station on the transporter 230 (see FIG. 1).

In block 640 the method 500 of FIG. 5 is again performed, this time to re-assemble the door removed from the holding fixture 220 on the vehicle body 120. In this operation the part having the target is the vehicle body 120, and the target 121 (only schematically indicated on FIG. 1) includes the vehicle body hinge bushings (not shown in detail in the figures), in which the hinge pins 322, 323 of the door (see FIG. 3a) are inserted during the assembly operation.

In examples of methods and assembly unit or systems as disclosed herein, one industrial robot or several industrial robots may be employed, either working independently from each other or working jointly, for example gripping and/or assembling a part between them, delivering a part from one robot to another, etc. When several robots are employed, they may each have an associated vision system, or several of them may be controlled using data from the same vision system.

In the present disclosure an "industrial robot" is an automatically controlled, reprogrammable multipurpose manipulator that is programmable in three or more axes, in accordance with the definition of ISO Standard 8373. The robot axes are each provided with an actuator, for example a motor, and each individually programmable and controlled. They may be arranged, for example in series, between a robot base which is attached to the floor, roof mounted, etc., and a robot wrist to which end effectors may be fitted.

Examples of commercial industrial robots that may be employed in an assembly line such as disclosed herein may be models IRB 4600, IRB 6700, IRB 7600, etc., all available from ABB, in Zurich, Switzerland.

The robot base of industrial robots employed in implementations disclosed herein may be directly attached to the floor, or it may be mounted on a supporting structure, roof mounted, mounted on a moving track, etc. In case the robot base is mounted on a moving track, the movement of the track may be controlled by the robot controller and may be considered conceptually as an additional programmable degree of freedom or axis of the robot itself.

Different end effectors to be operated by the industrial robot may be mounted on the wrist of the robot: for example, grippers for handling an assembly component to be mounted on a part such as a vehicle body in an assembly line, tools such as a welding tool, etc.

Although only a number of particular implementations and examples have been disclosed herein, it will be understood by those skilled in the art that other alternative implementations and/or uses of the disclosed innovations and obvious modifications and equivalents thereof are possible. The scope of the present disclosure should not be limited by particular implementations, but should be determined only by a fair reading of the claims that follow.

The invention claimed is:

1. A method comprising:
   providing a part having a target at which an assembly operation is to be performed by an industrial robot,
   providing a component to be assembled on the target of the part having the target,
   providing the industrial robot with an end effector and a location-detecting utensil attached to the end effector, the location-detecting utensil being definitively a discrete element from the component to be assembled and discrete from the part having the target and discrete from the target, the location-detecting utensil being used solely for detecting the location of the target,
   determining the target position by:
      controlling the end effector of the robot to approach the target,
      detecting a contact between the location-detecting utensil and the target, based on the readings of a force sensor,
      controlling the end effector of the robot at least by force control, based on the contact between the location-detecting utensil and the target and on the readings of the force sensor, to reach a predetermined position of the location-detecting utensil relative to the target, and
      determining the target position as indicated by the absolute position of the location-detecting utensil when the location-detecting utensil is in contact with the target and is in said predetermined position relative to the target,
   registering the position of the target,
   controlling the end effector of the robot to withdraw the location-detecting utensil in contact with the target away from the target before performance of the assembly operation, and
   controlling, after withdrawal from the target of the location-detecting utensil, the end effector of the robot to perform the assembly operation at the registered target position.

2. A method according to claim 1, including controlling the end effector of the industrial robot to approach the target based on the readings of a vision system comprising a vision sensor mounted on the end effector.

3. A method according to claim 2, the determining the target position further comprising controlling the end effector of the robot to reach the predetermined position of the location-detecting utensil relative to the target by a combination of the readings of the vision system and force control based on the readings of the force sensor.

4. A method according to claim 1, indicating the target position and the target orientation by the absolute position of the location-detecting utensil when the location-detecting utensil is in the predetermined position relative to the target, and once the predetermined position of the location-detecting utensil relative to the target has been reached, the target position and orientation are registered, and the end effector of the robot is controlled to perform the assembly operation at the registered target position and according to the registered target orientation.

5. A method according to claim 1, further including moving the part having the target on which an assembly operation is to be performed during the determination of the target position and during the assembly operation, and the method further comprises:

tracking the movement of the part, and controlling the end effector of the robot to perform the assembly operation based on the registered target position and based on the tracking of the movement of the part from the moment the position of the target is registered until the assembly operation is completed.

6. A method according to claim 1, the assembly operation comprising dropping or mounting a component carried by the end effector on the target.

7. A method according to claim 6, the end effector carrying the component to be assembled on the target during the determining of the target position.

8. A method according to claim 6, the end effector picking the component to be assembled on the target after the determining of the target position.

9. A method according to claim 6, further comprising, when the component is carried by the end effector of the robot, determining and registering the position and/or orientation of the component with respect to the industrial robot, by:

controlling the end effector so that the component approaches an auxiliary location-detecting utensil, once there is contact between the auxiliary location-detecting utensil and the component, controlling the end effector of the robot at least through force control, based on the readings of the force sensor, to reach a predetermined position of the component with respect to the auxiliary location-detecting utensil; and registering the position and orientation of the component, with reference to the robot base.

10. A method according to claim 1, the part having a target being a vehicle body mounted on a transport system and advanced in an automotive final assembly line, and the industrial robot being arranged in the assembly line to pick, drop or mount a vehicle component at the target of the vehicle body.

11. A method according to claim 1, the location-detecting utensil being a dedicated location-detecting utensil, separate from a component to be assembled in the assembly operation.

12. A method according to claim 11, comprising configuring the location-detecting utensil with a shape adapted to the target at which the assembly operation is to be performed.

13. A method for assembling a component on a target of a vehicle body in an automotive final assembly line, comprising:

advancing the vehicle body in the assembly line, and performing the method according to claim 1, the part having a target being the vehicle body and the assembly operation performed by the end effector of the robot comprises mounting the component on the vehicle body.

14. A method for assembling components on a vehicle body in an automotive final assembly line, the method comprising:

removing with an industrial robot a vehicle door from a vehicle body hinge at a first station of the automotive final assembly line, performing the method according to claim 1, the part having a target being a holding fixture separate from the vehicle body, and the target being a feature of the holding fixture, such as a hinge, and the assembly operation comprising assembling the vehicle door on the feature of the holding fixture, and re-assembling the vehicle door on the vehicle body hinge at a second station of the automotive final assembly line, downstream of the first station in the direction of advance of the vehicle body along the line, by:

removing with an industrial robot the vehicle door from the holding fixture, and performing the method according to claim 1, the part having a target being the vehicle body, and the target being the vehicle body hinge, and the assembly operation comprising assembling the vehicle door on the vehicle body hinge.

15. An assembly unit or system for assembling a component on a target of a part in an assembly line, the assembly unit or system comprising:

an industrial robot having at least three axes between a robot base and a robot wrist, an end effector attached to the robot wrist, and having attached thereto a location-detecting utensil and a gripper to pick and release the component to be assembled, the location-detecting utensil being definitively a discrete element from the component and discrete from the part and discrete from the target, the location-detecting utensil being used solely for detecting the location of the target, a force sensor arranged to sense external forces acting on the end effector, and a controller, the controller determining and registering the position of the target of the part, by:

controlling the end effector to approach the target, detecting a contact between the location-detecting utensil and the target, based on the contact between the location-detecting utensil and the target and on the readings of the force sensor, controlling the end effector at least by force control, based on the readings of the force sensor, to reach a predetermined position of the location-detecting utensil relative to the target, determining the target position as indicated by the absolute position of the location-detecting utensil when the location-detecting utensil is in contact with the target and is in said predetermined position relative to the target, and registering the target position;

and the controller controlling the end effector to:

withdraw the location-detecting utensil in contact with the target away from the target before performance of the assembly operation; and, perform the assembly operation at the registered target position, after withdrawal from the target of the location-detecting utensil.

16. An assembly unit or system according to claim 15, further comprising the force sensor being mounted on the robot between the wrist and the end effector and providing data about external forces and torques acting on the end effector, and therefore about the relative position between the end effector and the location-detecting utensil.

17. An assembly unit or system according to claim 15, further comprising a vision system with a tracking vision sensor for tracking the movement of the part along the assembly line, and the controller controlling the end effector of the robot to perform the assembly operation at the target position based on the registered target position and based on the tracking of the movement of the part.

* * * * *